UNITED STATES PATENT OFFICE.

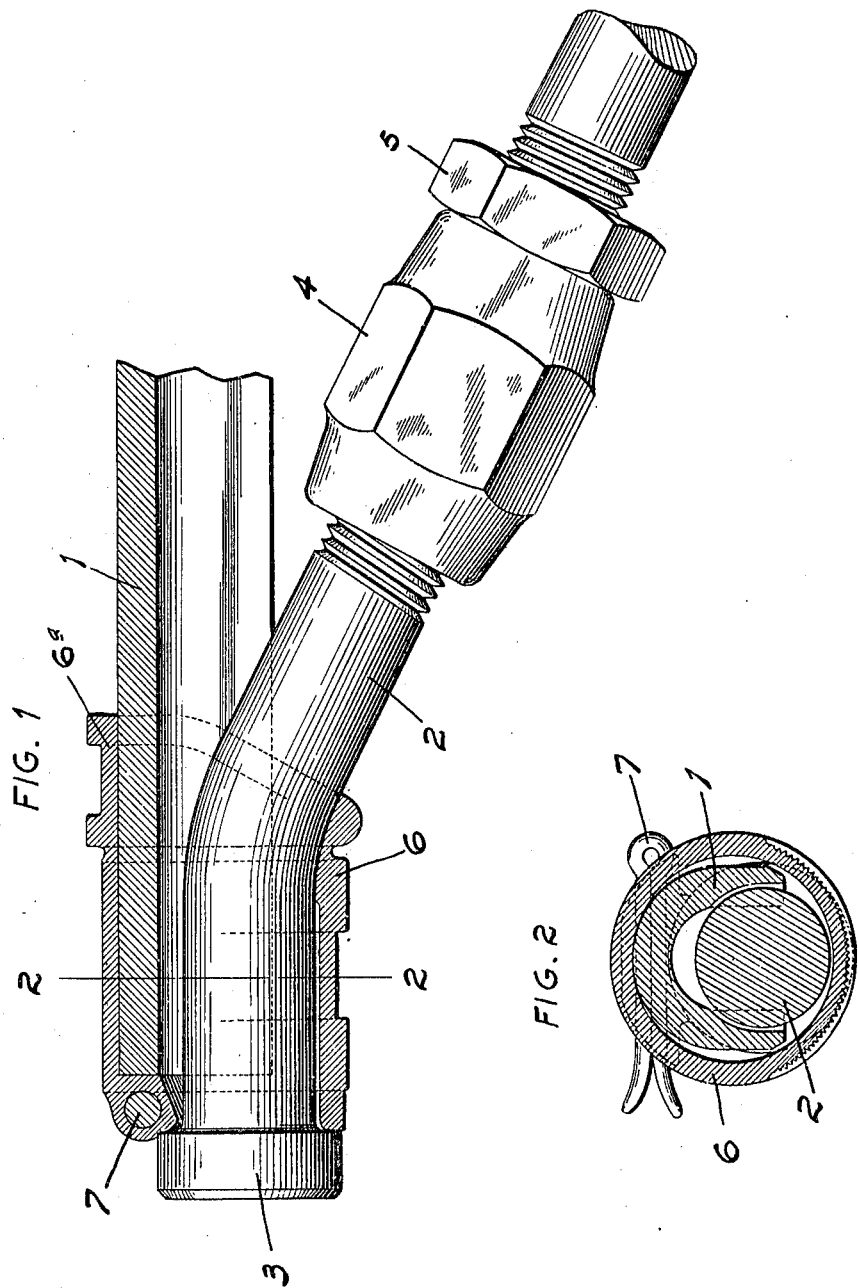

PHILIP B. HARRISON, OF CHICAGO, ILLINOIS, ASSIGNOR TO CHICAGO RAILWAY EQUIPMENT COMPANY, OF CHICAGO, ILLINOIS, A CORPORATION OF ILLINOIS.

BRAKE-BEAM.

956,087.   Specification of Letters Patent.   Patented Apr. 26, 1910.

Application filed October 11, 1909.   Serial No. 521,980.

*To all whom it may concern:*

Be it known that I, PHILIP B. HARRISON, a citizen of the United States, residing at Chicago, Illinois, have invented a certain new and useful Improvement in Brake-Beams, of which the following is a full, clear, and exact description, such as will enable others skilled in the art to which it appertains to make and use the same, reference being had to the accompanying drawings, forming part of this specification, in which—

Figure 1 is a sectional view through the end of my improved brake beam. Fig. 2 is a sectional view on line 2—2 of Fig. 1.

This invention relates to a new and useful improvement in brake beams, and is designed particularly for use as a "high speed" brake beam. These so-called "high speed" brake beams are largely used on passenger coaches, sleeping and dining cars.

The object of my present invention is to materially increase the sizes of the compression and tension members without increasing the size of the sleeve, whereby the brake heads now in use can be employed on my improved beam. In this manner I am enabled to get a very strong brake beam, that is, one which will show a minimum deflection under a maximum load.

Heretofore, where the size of the so-called sleeve or thrust block is limited to accommodate brake heads of standard size, such as prescribed by the Master Car Builders, the limit of sizes of compression members and tension members, of various forms, where they pass through the thrust block or sleeve, has been reached. Hence it has been impossible in existing constructions to get heavier forms of compression and tension members through the restricted space allowed, and consequently it has been impossible to supply the demand for stronger or more rigid brake beams where the limitation of size concerning the brake head and sleeve remain the same.

My improved construction, while apparently simple, is most important, as it meets recent requirements for increased efficiency in brake beam construction. It is possible according to my invention to increase the size of the short tension rod, without interfering with other dimensions, which enables me to get a brake beam of any required capacity.

According to the requirements of the new Westinghouse brake, the brake beam must stand a load of 42,000 pounds, with one-sixteenth of an inch (1/16″) deflection. This has been thought impossible of attainment on account of the limitations of the fixed dimensions. In my construction I can use a tension rod as large in diameter as desired and increase the size of the compression member, as desired.

In the drawings, 1 indicates the compression member, which is preferably U-shaped in cross section, and 2 is a tension member having solid heads 3 at its ends formed by upsetting the metal at this point. The tension member is preferably made up of several parts whose adjacent ends are threaded in opposite directions to coöperate with a right and left hand nut 4. A jam nut 5 may be used in connection with the nut 4. The inner faces of the legs of the compression member are cut away, as shown in Fig. 2, to fit the end section of the tension member.

6 indicates a thrust block or sleeve forming a seat for the compression member, said thrust block or sleeve having an opening in which is arranged the end section of the tension member. The end of this sleeve forms a seat against which the head of the tension member rests. The sleeve or thrust block may be provided with a channeled portion, in the bottom of which corrugations or teeth are arranged for coöperation with the well known type of adjustable brake head. This thrust block or sleeve is also preferably provided with an inwardly extending portion 6ᵃ constituting a reinforcing member. If desired, a cotter pin 7 may be arranged in an opening extending transversely the end of the sleeve to hold the brake head in position.

In assembling the parts, the sleeves are fitted on the ends of the compression members, and the end sections of the tension member are introduced from the outside. The middle section of the tension member is arranged over the strut, not shown, over which the nuts are tightened to place a tension in the tension member and a camber in the compression member. If desired, the extreme end of the tension member, instead of being provided with a solid head may be threaded to receive a nut. I prefer to use the solid head, however, because by so doing I can employ a larger size tension rod.

This is a companion application to Serial No. 506,026, filed July 6, 1909.

I claim:

1. In a brake beam, the combination of a compression member, a sectional tension member, the end sections of which are provided with solid heads, a thrust block or sleeve forming a seat for said compression member and against which the solid head of said tension member is seated, and means for connecting and drawing the sections of said tension member together.

2. In a brake beam, the combination of a U-shaped compression member, the inner faces of whose legs are cut away at the ends to receive a tension member, a tension member, a thrust block or sleeve against which said compression and tension members are seated, and means for placing a tension in said tension member.

3. In a brake beam, the combination of a U-shaped compression member, a sectional tension member, a thrust block or sleeve, means for connecting sections of said tension member together, and means for locking said connecting means against movement.

4. In a brake beam, the combination of a U-shaped compression member, a tension member composed of three sections, the end sections of which are formed with solid heads, means for connecting said sections together, and means for locking said connecting means against movement.

5. A tension rod for brake beams, composed of sections, the end sections of which are provided with heads, separable sleeves coöperating with said heads, and the contiguous ends of which are threaded, whereby tension may be placed in the tension rod on each side of the strut.

6. A tension rod for brake beams, composed of sections, the contiguous ends of which are threaded whereby tension may be placed in the tension rod on each side of the strut, and the end sections passing through sleeves and being bent parallel to the axis of the compression member for a portion of their length.

In testimony whereof I hereunto affix my signature in the presence of two witnesses, this 7th day of August, 1909.

PHILIP B. HARRISON.

Witnesses:
EDWARD T. WALKER,
JOSEPH W. WEINLAND.